United States Patent [19]

Mueller-Lobeck

[11] 4,003,688
[45] Jan. 18, 1977

[54] REVOLVING CYLINDRICAL ESCAPEMENT EXTRUSION APPARATUS FOR SHAPING FOODSTUFF ARTICLES

[75] Inventor: Eberhard Mueller-Lobeck, Stamford, Conn.

[73] Assignee: Automation International Corporation, Norwalk, Conn.

[22] Filed: Dec. 26, 1974

[21] Appl. No.: 536,346

[52] U.S. Cl. .............................. 425/465; 425/380
[51] Int. Cl.² ........................................ B29C 23/00
[58] Field of Search .......... 425/311, 192, 380, 465, 425/313, 239, 241

[56] References Cited

UNITED STATES PATENTS

| | | | |
|---|---|---|---|
| 2,096,529 | 10/1937 | Sizer | 425/313 |
| 2,981,211 | 4/1961 | Emerzian | 425/465 |
| 3,142,091 | 7/1964 | Curtiss | 425/374 X |
| 3,394,431 | 7/1968 | Nalle | 425/380 X |
| 3,482,279 | 12/1969 | Anders et al. | 425/192 |
| 3,507,010 | 4/1970 | Doleman et al. | 425/192 X |
| 3,541,974 | 11/1970 | Atkins | 425/241 |
| 3,871,810 | 3/1975 | Geyer | 425/465 X |

FOREIGN PATENTS OR APPLICATIONS 657,994 1/1965 Belgium .............................. 425/313

Primary Examiner—Richard B. Lazarus
Assistant Examiner—Robert J. Charvat
Attorney, Agent, or Firm—Parmelee, Johnson & Bollinger

[57] ABSTRACT

A revolving cylindrical escapement extrusion apparatus for shaping foodstuff articles of the type having a nozzle orifice slot and means for feeding foodstuff material under pressure for extrusion through this elongated orifice. A cylindrical escapement valving member revolves adjacent to the downstream side of an adjustable orifice slot and preferably includes at least two axially spaced and circumferentially overlapping openings in its cylindrical perimeter for shaping foodstuff blanks, and it revolves its shaping openings in front of the adjustable orifice slot for controlling the extrusion of foodstuff material through the slot to shape the material into product blanks. By virtue of having at least two circumferentially overlapping openings in the revolving cylindrical escapement member there is achieved a continuing flow of the material being extruded. As the escapement member is diminishing the flow rate being shaped by one of its openings it is concurrently increasing the flow rate being shaped by another of its openings, thereby producing an aggregate flow which continues and in which the flow rate does not unduly surge.

17 Claims, 10 Drawing Figures

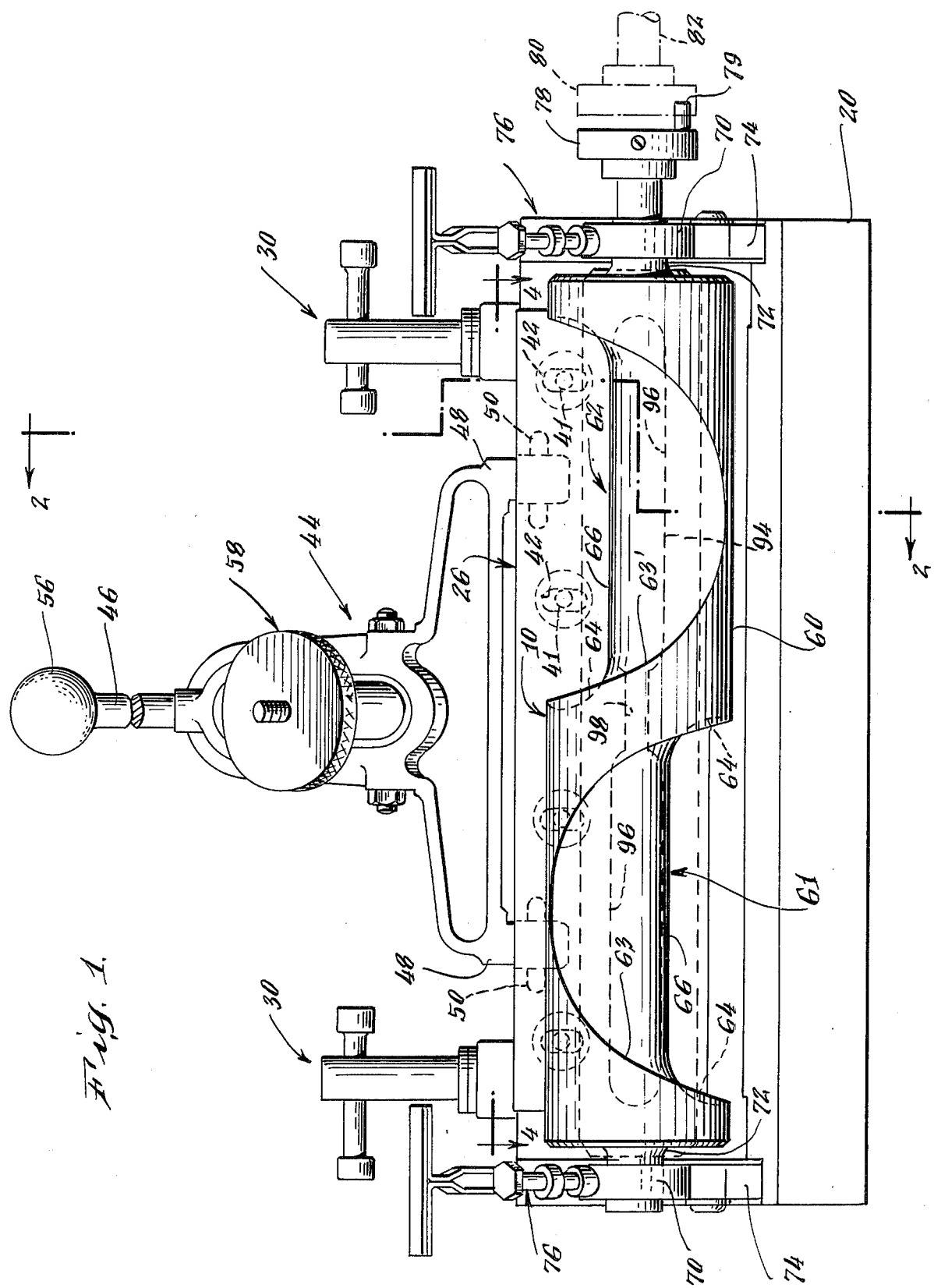

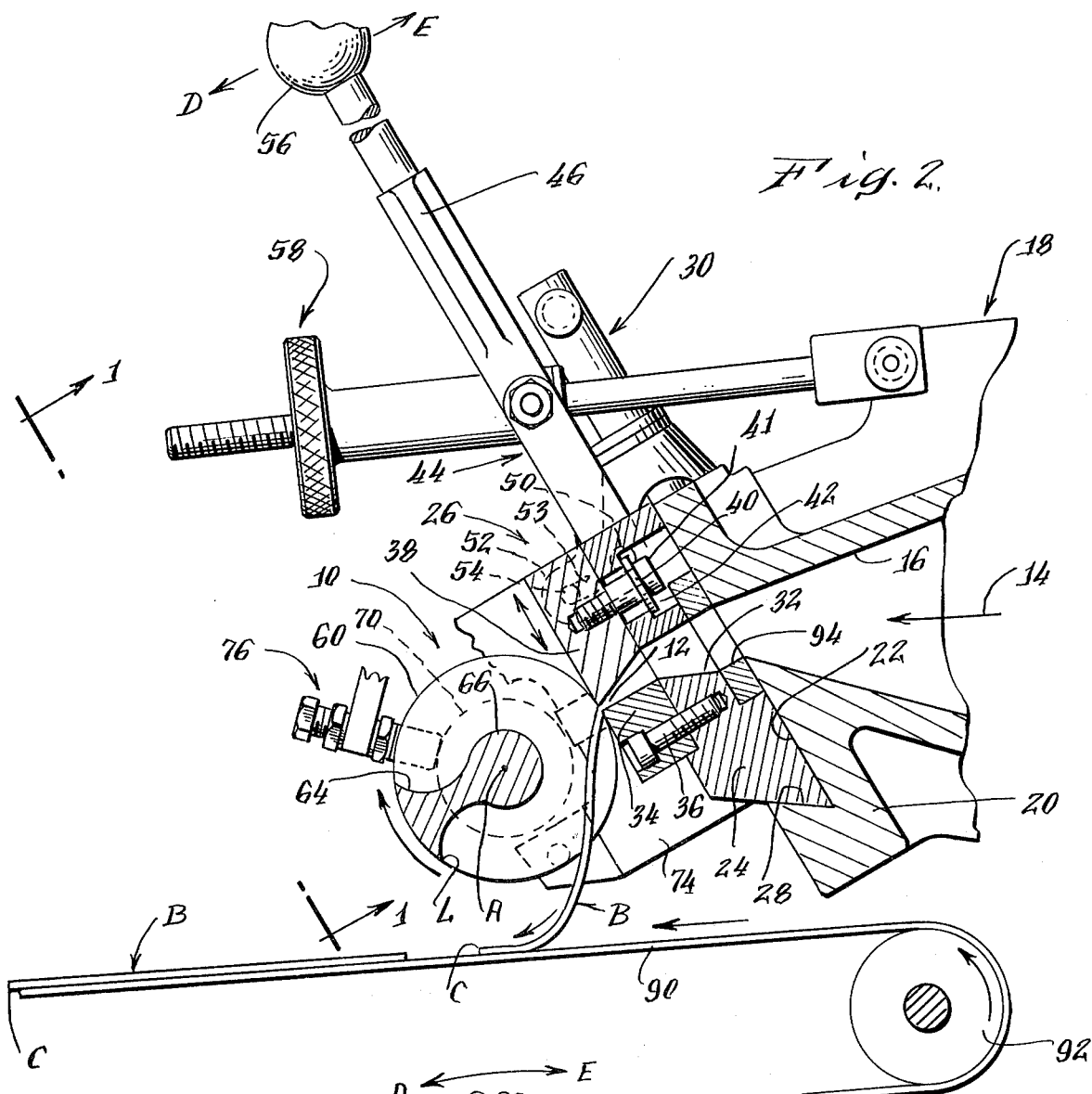
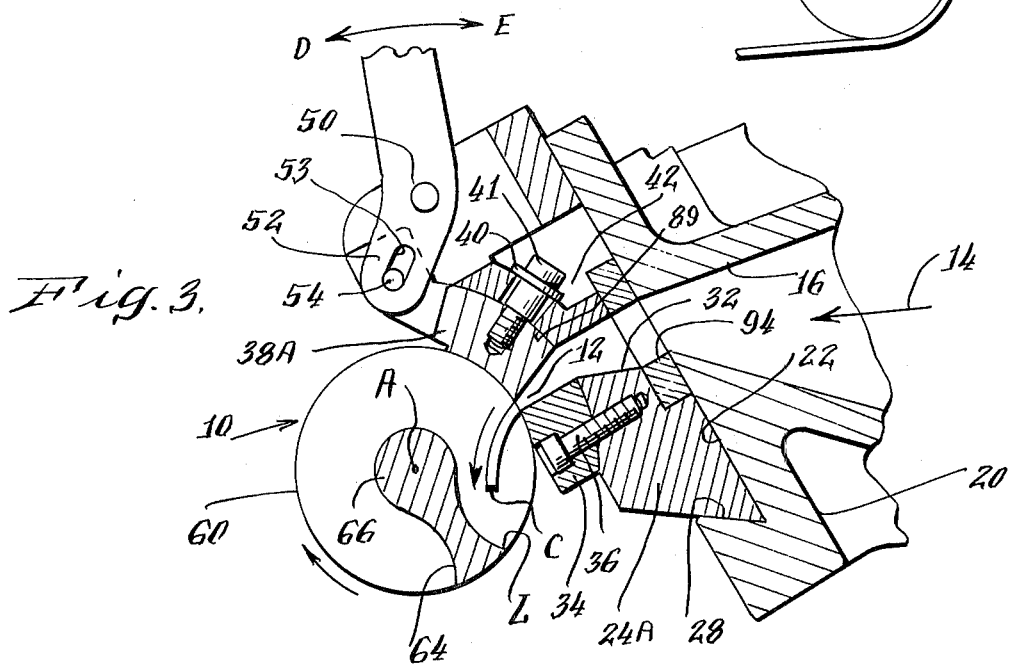

REVOLVING CYLINDRICAL ESCAPEMENT EXTRUSION APPARATUS FOR SHAPING FOODSTUFF ARTICLES

BACKGROUND OF THE INVENTION

1. Field of the Invention

The present invention relates to an apparatus for extruding foodstuff material and shaping this material into blanks for forming foodstuff articles.

Foodstuff material such as dough may be extruded to form blanks for subsequent treatment to make such products as pie crusts, tortillas, pancakes, pizza rounds, or other food products. It is also possible to form such products into different shapes such as discs, hearts, triangles, diamonds or the like, whatever is most appropriate. The preferred embodiment of the present invention is used to perform the extrusion and shaping functions.

2. Description of the Prior Art

Apparatus for extrusion and shaping of foodstuff material is presently known. U.S. Pat. No. 2,981,211 —Emerzian discloses a food-product forming machine having a cylinder head unit with a hollow rotatable sleeve inside of this unit. An extrusion slot is formed in the bottom of the cylinder head unit, and dough is pumped into this head unit by a piston arrangement to be subsequently forced out of the extrusion slot while being shaped by the internal rotating sleeve which has a large circumferential opening in its wall.

The dough extrusion machine disclosed in the Emerzian patent has several drawbacks. The cylinder head unit with its internal rotating sleeve is intended to be completely filled with dough at all times, thus exposing the dough to the sleeve support shaft and bearings, which are inside of the head unit where sanitary cleansing is difficult. A radial support post for rthe rotating sleeve must be churned through the dough as the sleeve revolves, thus interfering with the volume of dough in the head unit. Consequently, substantial power is consumed driving the rotating sleeve and churning the radial post through the dough while at the same time pumping the cylinder full of dough. In addition, the internal sleeve shapes one dough product at a time, alternatively completely opening and completely closing the extrusion slot. Thus, severe pressure surges or fluctuations are generated within the dough as it approaches the extrusion slot, because there is a change from Zero flow to full flow and back to zero flow during each cycle.

U.S. Pat. No. 3,320,905 — Urschel discloses a conical disc which rotates past a sequence of slots through which dough is extruded. The disc has a number of die openings which produce the desired dough blank shapes. Similar systems are disclosed in U.S. Pat. Nos. 3,255,715 and 3,329,101 also issued to Urschel.

Other prior art extrusion apparatus using revolving members are shown in U.S. Pat. Nos. 3,525,785 — Fairbanks; 3,748,079 — Moreno, et al.; and 3,680,994 — Longenecker.

Prior art foodstuff extrusion apparatus of the type referred to above having disadvantages which are overcome by the present invention as will be explained.

DESCRIPTION

Foodstuff material extrusion apparatus typically include a long and narrow nozzle orifice and feeding means, such as a screw arrangement illustrated in U.S. Pat. No. 3,680,994 — Longenecker, for feeding foodstuff material under pressure through this orifice. In this fashion, the foodstuff material is extruded in sheet blanks having a substantially uniform thickness, which may be carried away on a conveyor belt, such as that disclosed in the Longenecker patent. In the illustrative embodiments of the present invention a similar feedscrew arrangement is used forcing foodstuff material toward a nozzle orifice. The present invention provides unique and novel means for shaping the foodstuff material into suitable blanks in readiness for subsequent processing, and for controlling the thickness and shapes of the foodstuff material blanks so formed.

In the apparatus of the present invention there is an adjustable nozzle orifice with a cylindrical escapement member revolving adjacent to the downstream side of this orifice slot, including at least two axially spaced and circumferentially overlapping foodstuff shaping openings in its cylindrical periphery for shaping the foodstuff material being continuously extruded through the slot. This revolving cylindrical escapement member is positioned at the outside downstream side of the adjustable orifice slot and revolves while foodstuff material is extruded from the orifice slot to control the extrusion and to shape the foodstuff material into product blanks.

Because the cylindrical member which controls extrusion and shapes the extruded product blank is advantageously positioned exteriorly of, and at the downstream side of the adjustable orifice slot, it is only the periphery thereof which comes into contact with the foodstuff material. The foodstuff material is released and shaped by the sharp edges of the openings in the periphery of the revolving cylindrical member. There is no significant contact of the foodstuff material with the inside of the cylindrical member. Since the whole cylindrical member is fully accessible and readily available for cleansing, sanitary conditions are easily maintained. Power is conserved since no internal cylinder parts are churned within and through a mass of foodstuff material.

The revolving cylindrical escapement member has a plurality of axially spaced and circumferentially overlapping openings which are positioned in the cylindrical periphery so that a portion of at least one opening always is adjacent to the elongated orifice slot for continuously releasing foodstuff through the slot. Thus, continuous extrusion is always occurring since foodstuff material is always escaping by at least one opening and the aggregate rate of flow does not unduly vary, so that significant pressure surges in the foodstuff material approaching the inside of the orifice slot are avoided. This novel feature of the present invention decreases problems which may result from pressure surges which occur when extrusion of foodstuff material is varied in each cycle between zero flow, full flow and zero flow conditions.

In one preferred embodiment of the revolving cylinder, foodstuff blank shaping extrusion apparatus of the present invention, the die assembly includes opposing die plates which define the elongated nozzle orifice slot. One of the die plates is fixed relative to the die assembly and has a curved surface concentric with and in contact with the cylindrical member. The other of the die plates is mounted to be adjustably, selectively moved relative to the fixed die plate in a path which is tangential to the revolving cylindrical member. This adjustable feature permits variation of the width of the nozzle orifice slot to regulate the thickness of the foodstuff material blanks being extruded.

In another embodiment of the present invention, the movable die plate also has a curved surface which is concentric with and in contact with the revolving cylindrical member. This movable die plate is mounted to be selectively moved in a path concentric with the cylindrical member relative to the fixed die plate to variably adjust the width of the orifice slot.

Therefore, it is among the ovjectives of the present invention to provide a unique and novel extrusion foodstuff shaping apparatus for forming foodstuff product blanks, such as blanks of dough for pancakes, pie crusts, tortillas, pizza rounds, or blanks of other extrudable foodstuff material for making other food products, such as blanks for tarts, ravioli, and the like.

Other objects, advantages, and aspects of the present invention will be pointed out in, or will become more fully understood from a consideration of the detailed description provided below, in conjunction with the accompanying drawings.

BRIEF DESCRIPTION OF THE DRAWINGS

FIG. 1 is a front elevational view, as seen looking from the plane 1—1 in FIG. 2, showing the foodstuff blank shaping extrusion apparatus of the present invention and illustrating the exterior revolving cylindrical escapement member having the plurality of openings formed in its periphery and with certain interior structure elements shown by dashed lines;

FIG. 2 is a cross-sectional view of this apparatus taken through section 2—2 in FIG. 1;

FIG. 3 is a cross-sectional view similar to FIG. 2 but showing a modified embodiment of the adjustable orifice slot apparatus;

DETAILED DESCRIPTION

Figure 4:
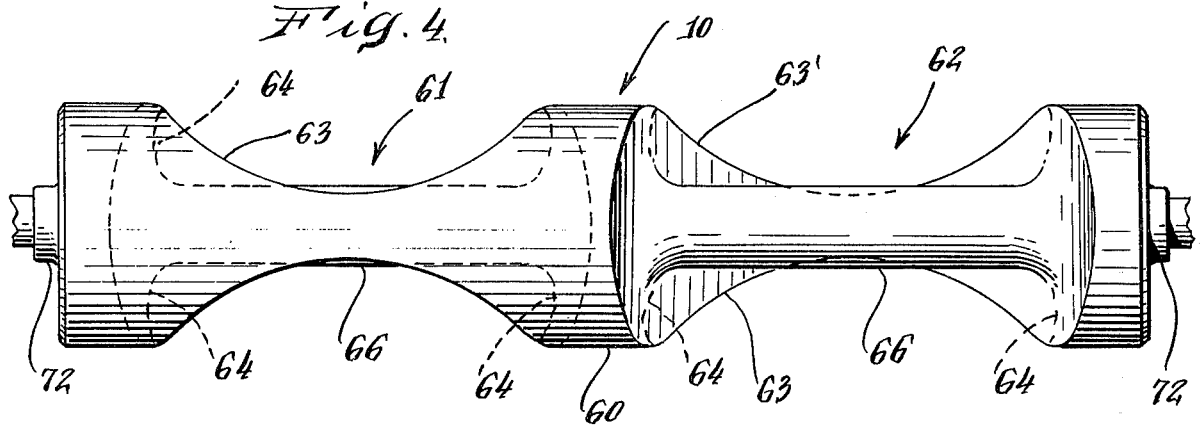
FIG. 4 is an elevational view of the revolving cylindrical escapement member as seen in plan looking downwardly from the plane 4—4 in FIG. 1.

As shown in FIGS. 1 and 2, a revolving cylindrical member 10 is mounted adjacent to the downstream side of an elongated orifice slot 12. Blanks B of foodstuff material are formed by the action of this cylindrical member, which revolves in a clockwise direction as seen in FIG. 2, in controlling and shaping the extrusion of foodstuff material issuing through the orifice slot 12, as will be explained in detail further below. This foodstuff material may be any suitable extrudable material for forming blanks to be used for making tortillas, pancakes, pie crusts, pizza rounds, tart crusts, ravioli shells, pastry shells, and the like.

The foodstuff material is generally indicated by the arrow 14, and it is propelled forward under pressure through an outlet throat passage 16 in the extrusion apparatus 18. The means for pressurizing and propelling the foodstuff material 14 forward through the throat passage 16 toward the orifice slot 12 may be a feedscrew (not shown) such as that illustrated in Longenecker U.S. Pat. No. 3,680,994.

At the discharge end of the throat passage 16 there is a flange 20 defining a mounting surface 22 on which is seated a support plate 24 of the adjustable orifice apparatus 26. The lower edge of this support plate is wedge-shaped to engage in a recess 28, and a pair of dog clamps 30 (FIG. 1) removably hold the support plate 24 against the mounting surface 22. Thus, the whole adjustable orifice apparatus 26 together with the revolvable cylindrical member 10 can be quickly and easily removed from the mounting surface 22 by loosening the two dog clamps 30.

As seen in FIG. 2, there is an elongated converging opening 32 in the support plate 24 which provides communication between the throat passage 16 and the orifice slot 12. The elongated orifice slot 12 is defined between a fixed die plate member 34 which is anchored to the support plate 24 by a plurality of screws 36 and a movable die plate member 38. This movable member 38 is slidable up or down against the front surface of the support member 24, being resiliently pressed against the support plate 24 by spring means 40. In this illustrative example the spring means 40 comprise spring washers secured by a plurality of machine screws 41 (only one screw can be seen in FIG. 2). A clearance space 42 around the shank and head of these screws 41 permits the movable die member 38 to be moved toward or away from the fixed die member 24.

Adjustment means 44 are provided for moving the die member 38 toward or away from the fixed die member 24 to vary the width of the orifice slot 12 and hence the thickness of foodstuff material being extruded therethrough. In this illustrative example, the adjustment means 44 includes a manually operable lever 46 having a pair of legs 48 which are pivoted by pivot means 50 (FIG. 1). This pivot means 50 may include pins engaged in anchoring slots in the legs 48 or alternatively in the upper edge of the support plate 24, as shown. As shown in FIG. 2, there are forward extensions 52 of the legs 48 which engage hinge pin means 54 forming a hinged connection between the extensions 52 and the movable die 38. This hinge pin means 54 may include elongated openings 53 in the movable die 38 or alternatively in the forward extensions 52 of the legs 48, as shown in FIGS. 2 and 3. Thus, moving the adjustment handle 56 backward or forward, as indicated by the aarrows in FIGS. 2 and 3, will enlarge (E) or decrease (D) the thickness of the blanks B being extruded.

Figure 7:
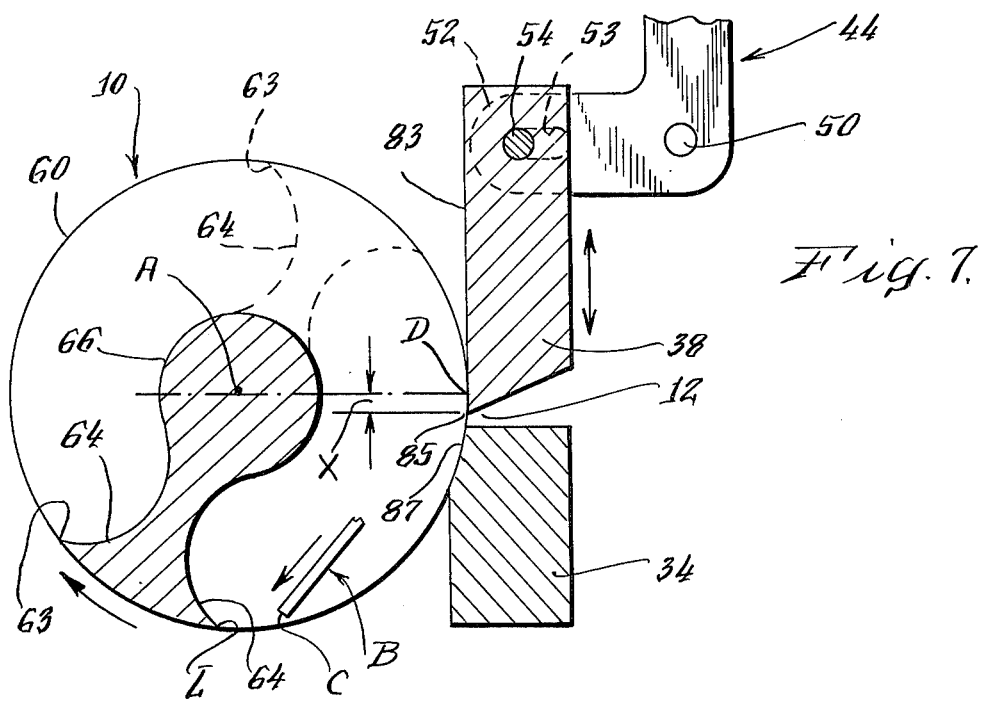
FIG. 7 is an enlarged sectional view showing the relationship of the adjustable orifice plate and the revolving escapement member.

As shown in FIGS. 2 and 7, the path which the movable die member 38 follows during adjustment is rectilinear since this movable die moves upward and downward against the flat front face of the support plate 24. For convenience of the operator, a vernier mechanism 58 for operating the die adjusting lever 46 may be provided, as illustrated in FIGS. 1 and 2. Such a vernier mechanism is described in detail in said Longenecker patent, and so it will not be described further herein.

The revolving escapement member 10 (FIGS. 1, 2 and 4) has a circular cylindrical peripheral surface 60, as seen in FIG. 2, with a pair of axially spaced, circumferentially overlapping foodstuff shaping openings or cavities 61 and 62 formed in this peripheral surface, thereby providing sharp edges 63 and 63' where these cavities respectively intersect the peripheral surface 60. In this illustrative example, the foodstuff shaping cavities 61 and 62 are intended for forming circular blanks B. I have found that it is advantageous to use ellipse-shaped edges 63 and 63', as outlined in FIG. 6, in which the major axis $M_1$ of the ellipse extends in the circumferential direction and the minor axis $M_2$ extends in the axial direction.

Figure 6:
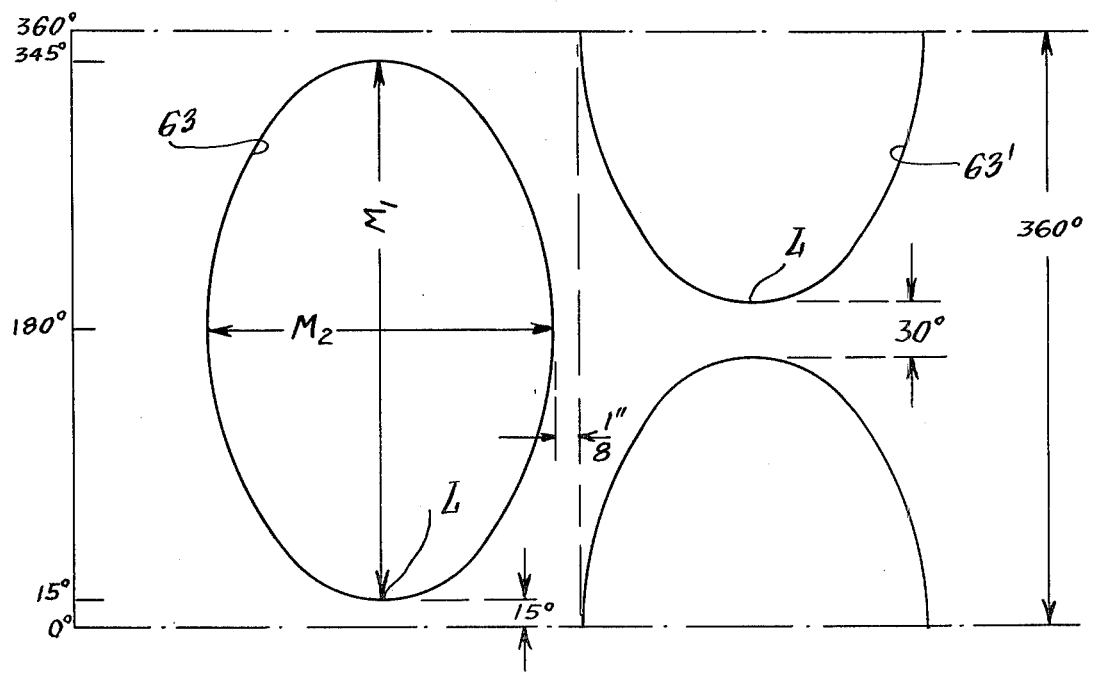
FIG. 6 is an unrolled layout diagram of the shaping edge of each of the openings of the revolving cylindrical member shown in FIGS. 1 and 4.

For example, as shown in FIG. 6, the major axis $M_1$ is more than 1.25 times as large as the minor axis $M_2$ for providing a significant ellipticity K in the forming edges 63 and 63', i.e., $$\frac{M_1}{M_2} = K > 1.25 \qquad (a)$$

This significant ellipticity advantageously causes the cutting edges 63 and 63' to sweep past the elongated orifice slot 12 at a faster rate than the blank B is being extruded through orifice 12. Thus, as illustrated in FIG. 3, the leading end L of each ellipse-shaped cutting edge 63 and 63' can sweep out of the path of the leading end C of the extruded circular blank B to avoid interference with the blank as it is being extruded.

The leading end C of the blank is essentially travelling along a chordal path, as shown in FIG. 3, of the circular periphery 60 (which is a short cut path), while the leading end L of the ellipse shaping edge 63 is travelling along a circular path (which is a round-about path). By virtue of the significant ellipticity K of the shaping edge 63, its leading end L moves sufficiently faster than the leading end C of the blank, so as to remain clear of the advancing blank.

The cavities 61 and 62 each extend around the major proportion of the circumference of the revolving escapement member 10. For example, as shown they extend 330° around this circumference. These cavities each have an undercut region 64 immediately contiguous with the shaping edge 63 so as to form a very sharp edge. The central portion 66 (FIG. 2) of the revolving member 10 is solid for strength and rigidity and so this central portion 66 together with the undercut region 64 as seen in cross section define a generally hour glass configuration.

By virtue of the fact that there are a plurality of circumferentially overlapping foodstuff escapement shaping openings 61 and 62, the flow 14 of extruded foodstuff is continuous, and thus there are no unduly large surges in the pressure within the throat passage 16. As seen in FIGS. 1, 2, 4, 6 and 7, the shaping edges 63 and 63' of these foodstuff forming cavities 61 and 62 extend over an angular range of approximately 330° about the axis A of the revolvable cylindrical escapement member 10. In addition, these openings are located at different angular positions about the axis A of said cylindrical member. As shown, each cavity 61 or 62 is situated 180° out of phase with rspect to the other cavity. Accordingly, these cavities overlap each other in a circumferential direction by approximately 300°. The advantageous result is that a portion of at least one of these openings is always positioned in front of the orifice slot 12 to permit extrusion of foodstuff material through it. In addition, as described above each opening 61 and 62 is provided with a sharp undercut edge or lip 63, 63', shown in FIGS. 4 and 6 for sharply defining and cutting the shape of the blank B which is desired.

In order to mount the revolvable member 10, there are a pair of bearing assemblies 70 (FIG. 1) positioned on a pair of stub shafts 72 projecting from opposite ends of this revolvable member. These bearing assemblies 70 are removably held in operating position in brackets 74 located at opposite ends of the support plate 24 by means of manually releasable toggle clamps 76. Accordingly, the revolvable escapement member 10 can be quickly and easily removed from its normal operating position adjacent to the orifice slot 12 for convenience in cleaning this member and the opposed die members 34 and 38.

The escapement member 10 may be revolved by any suitable drive mechanism, for example, as shown in FIG. 1, one of the stub shafts 72 may include a drive coupling 78 having a drive dog 79 which mates with a companion drive coupling 80 attached to power input shaft 82 which is mechanically driven, for example, by a pulley or gear mechanism (not shown).

As shown more clearly in FIG. 7, the movable die plate member 38 is adjustable along a rectilinear path as defined by the flat front face of the support plate 24. In order to permit this die member 38 to be adjusted along a straight path while preventing leakage of the foodstuff material between the peripheral surface 60 of the revolving member 10 and the adjustable die member 38, the planar front face 83 of this die plate member is positioned tangent at D to the circular cylindrical surface 60. Moreover, the straight die lip 85 of this die member is offset by an amount X below the axis A of rotation of the cylindrical member 10. The movable die plate 38 is adjusted along a straight path which is tangent at D to this cylindrical member 10. The range of travel of the movable die plate 38 is limited by the screws 41 and clearance 42 so that this range of travel does not exceed the amount of offset X. In particular, as shown in FIG. 7, the range of travel of the movable die plate 38, shown with reference to the lip edge 85, extends from a small distance X below the point D of die plate tangency with the cylindrical member up to the point D of tangency. In effect, the maximum range of die travel is equal to the offset X, and thus the planar front face 83 of the movable die plate 38 always remains in tangent contact with the revolving cylindrical surface 60 to prevent leakage of the foodstuff material past the point D.

As shown in FIG. 7, the front face of the stationary die 34 is provided with a curved surface 87 which is concentric with and contacts the cylindrical revolving surface 60. The movable die member 34 may be in contact with the cylindrical surface 60 or it may be spaced very slightly away from the cylindrical surface 60 to minimize wear. The fixed die member 38 prevents any undesirable amount of leakage between the exit lip of the die member and the revolving cylindrical member. Moreover, in the event any of the foodstuff material should pass between the curved die surface 87 and the revolving cylindrical surface 60, the material is carried around by the revolving cylinder. It is thereby returned back into the front of the orifice 12.

In the embodiment shown in FIG. 3, the movable die member 38A has a front face which is cylindrical and is concentric about the axis A of the revolving member 10. The adjustment lever 46 has forward extensions 52 with hinge pin means 54 for sliding the adjustable die member 38A along a circular path. The elongated opening 53 may be formed in the die or in the lever extension 52 as shown in FIG. 3. The front face of the support plate 24A is formed with a circular cylindrical surface 89 concentric about the axis A of the revolvable member 10 for causing the adjustable die member 38A to move along a circular path when its position is adjusted. The spring means 40 in FIG. 3 are similar to those discussed above in connection with FIG. 2 for urging the movable die member 38A against the surface 89.

As the food blanks B descend past the revolving escapement member 10, they are received on a suitable take-away means, for example, shown as a conveyor belt 90 trained around a pulley 92, thereby carrying the formed blanks B away toward the left in FIG. 2.

Figure 5:
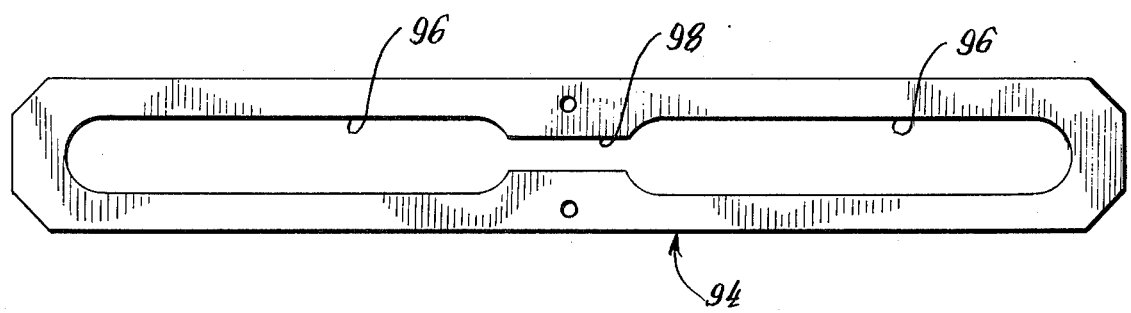
FIG. 5 is a front elevational view of the nozzle throat profile modifier die which can be removed and replaced.

In order to facilitate a desirable distribution of the flow rate of the foodstuff material with respect to the respective shaping cavities 61 and 62, I have found that it is desirable to provide a contour plate 94, as shown in FIG. 5, for modifying the profile of the throat passage 16 where it merges with the converging entrance 32 of the orifice slot 12. This contour plate 94 has a pair of main openings 96 of generally oval configuration interconnected by a narrow central slot opening 98.

As shown in FIGS. 2 and 3, this contour plate 94 may be clamped between the support plate 24 or 24A, and the mounting surface 22 at the front end of the extrusion apparatus 18. In this manner, various shapes of contour plate 94 can be inserted into the apparatus depending upon the particular configuration of the foodstuff shaping openings 61 and 62 in the revolvable member 10.

When using the ellipse cavities 61 and 62, as shown, the elongated oval shaped openings 96 have been found to operate to advantage in securing a substantially uniform distribution of the flow rate of the extruded foodstuff material across the full width of each of the shaping cavities 61 and 62. Thus, the flow rate of the foodstuff material being extruded to make each of the blanks B remains substantially uniform across the width of each blank B to produce an attractive food product.

The extrusion and foodstuff blank shaping operation is as follows: Foodstuff material 14 is fed under pressure through the outlet throat passage 16 and through the converging opening 32 in the support plate 24. This foodstuff material issues through the elongated orifice slot 12 as a sheet, the thickness of which is determined by the adjusted width of this orifice slot. Extrusion is controlled and the foodstuff material product blanks B are shaped by the interaction of revolving cylindrical member 10 and the slot 12 and the pressurized flow of foodstuff 14. The cylindrical member 10 revolves in the directions shown by the arrows in FIGS. 2, 3 and 7, and thus, the foodstuff shaping cavities 61 and 62 sweep downwardly past the orifice slot 12. When the respective cavities 61 and 62 are sweeping past orifice slot 12, foodstuff is extruded through this slot and is shaped by the sharp edges 63 and 63'. As shown in FIGS. 1, 2, 4 and 7, the edges 63, 63' of each cavity is undercut at 64, so as to be sharp at the peripheral cylindrical surface to precisely shear the extruded foodstuff as it issues through the orifice slot. Wherever a portion of this revolving cylindrical surface 60 covers the orifice slot, extrusion is blocked at the covered region.

As noted, the cylindrical member 10 revolves so as to sweep downwardly past the orifice slot, and therefore the extruded blank B can pass beneath the central portion 66 of the revolving member 10 along its chordal path drooping freely down toward the conveyor 90.

Figure 8A:
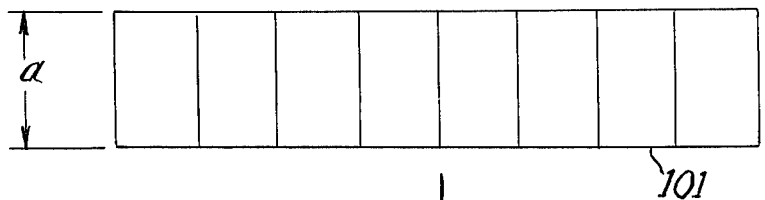
FIGS. 8A, 8B and 8C diagrammatically illustrate the function and operation of the nozzle throat profile modifier die which is shown in FIG. 5.
Figure 8B:
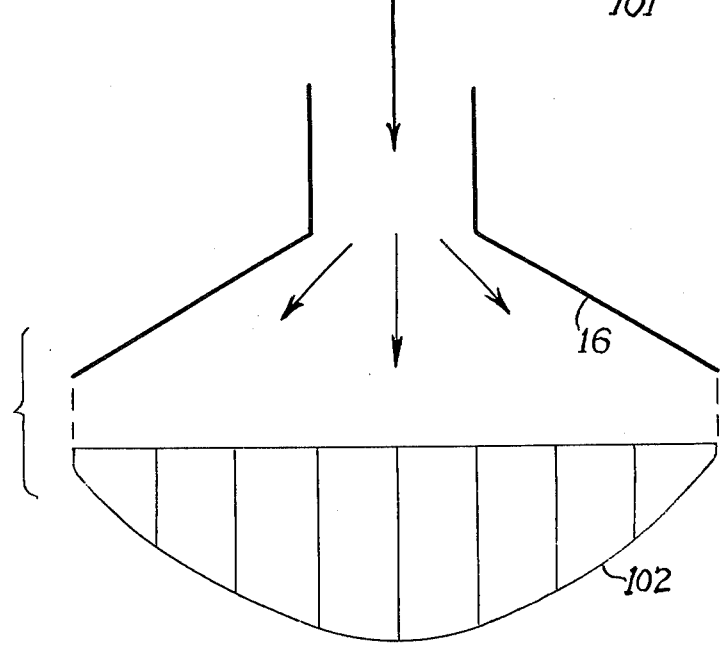
Figure 8C:
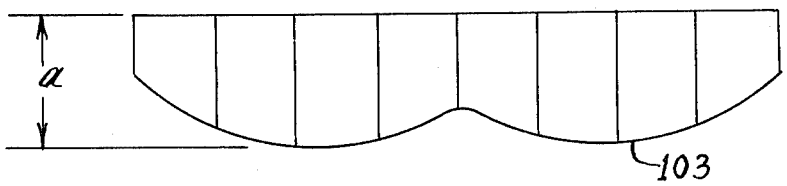

Attention is now invited to FIGS. 8A, 8B and 8C to explain the function and operation of the elongated nozzle throat profile modifier die plate 94 (FIG. 5). Usually, it is most desirable for the flow rate of the material being extruded through the orifice slot 12 to be substantially uniform across the full width of the orifice. Thus, as shown in FIG. 8A, if the extrusion velocity or flow rate through orifice 12 is $a$ centimeters per second, and if this flow rate is uniform across the full width of the orifice slot, then the flow rate distribution pattern is a rectangle 101, such as shown in FIG. 8A, in which the attitude of the rectangle is $a$.

A uniform flow rate distribution 101 is most desirable for producing commercial food blanks B because the velocity of the extruded material is the same in all points in the blank as it is extruded. Accordingly, each blank is extruded along a true path moving forwardly at all points uniformly away from the orifice slot 12, so that its shape becomes accurately predeterminable by the revolving edges 63 and 63'.

As shown diagrammatically in FIG. 8B in the material passing through the diverging outlet throat passage 16, leading toward the orifice slot 12, the flow rate distribution pattern actually becomes quite non-uniform. A high flow rate occurs near the center of the orifice slot with a progressively decreasing flow rate toward either end of this orifice slot. The cumulative frictional drag along the diverging sides of the throat 16, plus the natural tendency for the material to be pushed forward more rapidly along a direct path, as indicated by the relative lengths of the arrows within the throat passage 16, combine to produce an arched distribution pattern 102 for the flow rate. When the revolving cylindrical member 10 is operating with an arched flow rate distribution pattern 102, the respective product blanks being extruded and shaped by the revolving edges 63 and 63' do not tend to travel along true paths. Rather, the extrusion paths tend to curve and skew for each blank due to the higher velocity flow component existing near the center of the orifice slot. The resultant shaped blanks B become somewhat asymmetrical and are not commercially as attractive as those made when the flow rate distribution pattern is modified by insertion of a throat profile modifier die. Such a modifier die 94 may have various configuration, depending upon the desired modification to be produced in the normally occurring arched flow rate distribution pattern 102.

For example, as shown in FIG. 8C, a modified flow rate distribution pattern 103 is produced by usage of the throat profile modifier die 94 (FIG. 5). This pattern 103 has two broad rounded maxima of equal height $a$. From an overall practical effect, the flow rate distribution pattern 103 generally approximates the rectangular pattern 101, and I have found that the resulting shaped blanks B produced by using the modifier die 94 are essentially circular and are quite attractive from a commercial viewpoint.

It will be understood that the principle of using such an elongated outlet throat passage profile modifier die located upstream from the elongaged orifice slot can be extended to the use of various other configured shapes for the predetermined opening 96, 98, 96, as may be desired by the operator in any particular situation. This outlet passage modifier die 94 serves as means for influencing the flow rate distribution of the extrudable material within the outlet passage 16 upstream from the orifice slot 12.

With reference to FIG. 6, I have found it desirable to have an aggregate overlap of the respective openings 63 and 63' of at least two-thirds of the total circumferential extent of the cylindrical member, i.e., at least 240° and preferably more for avoiding undue pressure surges in the material being extruded.

Although two specific embodiments of the present invention have been described in detail above, it is to be understood that this is only for purposes of illustration and should not be construed as limiting the scope of the invention since modifications may be made to the described structures by those skilled in the art in order to adapt this apparatus to particular applications.

I claim:

1. Revolving cylinder escapement extrusion apparatus for forming an extrudable material into product blanks, such as blanks of dough for pancakes, pie crusts, tortillas, pizza rounds, crispy deep-fried articles and for forming blanks of other extrudable foodstuff material for making other food products, said extrusion apparatus comprising:
   nozzle means forming an elongated narrow orifice slot,
   feed means for feeding the extrudable material to said nozzle means under pressure for extruding the material through the orifice slot,
   a cylindrical escapement member having a cylindrical peripheral surface containing a plurality of axially spaced openings, said openings having sharp edges at the peripheral surface of said escapement member,
   mounting means for revolvably mounting said cylindrical escapement member at the outside downstream end of said nozzle means adjacent to said orifice slot and with the axis of said cylindrical member extending parallel with said elongated orifice slot,
   drive means for revolving said cylindrical member for moving the peripheral surface containing said openings past said orifice slot for controlling extrusion of the material from the orifice slot and for shaping said extruded material into product blanks as the respective cavities of said escapement member revolve past said orifice slot, and
   said axially spaced openings being angularly displaced about the axis of said escapement member and overlapping each other in the circumferential direction so that as the revolving escapement member is diminishing the flow of the material being shaped by the sharp edges of one of the openings the flow of the material being shaped by the sharp edges of another of the openings is concurrently increasing, thereby producing an aggregate flow of the material through said nozzle means which continues without undue surging.

2. Revolving cylinder escapement extrusion apparatus, as claimed in claim 1, in which:
   the respective openings are defined by sharp edges having an elliptical shape wrapped around the peripheral surface of said escapement member and having their major axes extending in the circumferential direction and their minor axes extending in the axial direction.

3. Revolving cylinder escapement extrusion apparatus, as claimed in claim 2, in which:
   the respective elliptical shaped openings have an ellipticity exceeding 1.25.

4. Revolving cylinder escapement extrusion apparatus, as claimed in claim 1, in which:
   said nozzle means includes a laterally diverging outlet throat passage leading to said elongated narrow orifice slot, and a removable throat passage profile modifier die positioned upstream from said orifice slot for modifying the flow rate distribution pattern through said orifice slot to said revolving cylindrical escapement member.

5. Revolving cylinder escapement extrusion apparatus, as claimed in claim 2, in which:
   said elliptical shaped openings extend around the major proportion of the circumference of said cylindrical escapement member, and
   the major portions of the circumferential extent of said openings are in circumferentially overlapping relationship.

6. Revolving cylinder escapement extrusion apparatus, as claimed in claim 5, in which:
   the aggregate overlap of the respective openings is at least two thirds of the total circumferential extent of the cylindrical member, i.e., at least 240°.

7. Revolving cylinder escapement extrusion apparatus, as claimed in claim 1, in which:
   the axial central portion of said revolvable escapement member is solid for strength and rigidity, and
   said axially spaced, angularly displaced openings are defined by cavities formed into the peripheral cylindrical surface of said escapement member, and
   said cavities are undercut near the cylindrical surface for providing sharp edges for said openings at the peripheral surface.

8. Revolving cylinder escapement extrusion apparatus, as claimed in claim 7, in which:
   a cross section taken through said solid central portion of said revolvable escapement member and through said undercut edges reveals an enlarged axial central portion with undercut regions located radially outwardly therefrom giving an overall general hour-glass configuration.

9. Revolving cylinder escapement extrusion apparatus for forming blanks of foodstuff material of the type wherein the material is fed under pressure toward an orifice slot comprising:
   means defining an outlet throat passage diverging in a downstream direction toward said orifice slot,
   a cylindrical escapement member,
   means revolvably mounting said escapement member at the outside downstream side of said orifice slot adjacent to said orifice slot, with the axis of rotation of said cylindrical member extending parallel with the length of said orifice slot,
   said revolvable cylindrical member having a plurality of axially spaced blank-shaping openings in its cylindrical surface defining sharp edges extending around said openings,
   drive means for revolving said cylinder member for moving said blank-shaping openings past said orifice slot for causing a shaped blank to be extruded from said orifice slot as each opening in the revolving escapement member moves past the slot,
   flow rate distribution influencing means associated with said diverging outlet throat passage, said flow rate distribution means being removably positioned upstream from said orifice slot for influencing the distribution of the flow rate of the material being extruded through said orifice slot, and
   said plurality of axially spaced blank-shaping openings being located at different angular positions about the axis of said cylindrical escapement member and overlapping each other in the circumferential direction for diminishing the flow of the extruded material being shaped by one of said openings while concurrently increasing the flow of the extruded material being shaped by another of said openings for producing an aggregate flow through said passage which continues without undue surging.

10. Escapement extrusion apparatus for shaping relatively wide and thin blanks for edible products, said apparatus being of the type having an extrusion orifice and feeding means for feeding foodstuff material under pressure to the orifice to thereby extrude the foodstuff material through the orifice to be shaped into such edible product blanks, said escapement extrusion apparatus comprising:

a die assembly defining a conduit for leading the foodstuff material downstream from said feeding means and a first and second die at the downstream end of said conduit, said first and second dies being positioned in spaced parallel relationship forming an elongated narrow orifice slot between said dies through which the foodstuff material is extruded, a cylindrical escapement member having a cylindrical peripheral surface, mounting means for revolvably mounting said cylindrical escapement member outside of and downstream from said die assembly and adjacent to the discharge side of said orifice slot with its axis of rotation extending parallel to the length of said orifice slot and with the cylindrical peripheral surface of said escapement member revolving adjacent to both said first and second dies, the cylindrical peripheral surface of said escapement member having at least one elliptical opening therein in which the major axis $M_1$ of the elliptical opening extends in the circumferential direction and the minor axis $M_2$ extends in the axial direction, said elliptical opening extending around the major proportion of the circumference of the revolving escapement member and being defined by a sharp product blank-shaping edge at the peripheral surface, said opening being undercut immediately contiguous with said edge for forming a sharp edge, means for revolving said cylindrical escapement member for moving said sharp edge of said elliptical opening past said orifice slot for controlling the escape of the foodstuff material being extruded through said orifice slot with said peripheral surface of said revolving member preventing the escape of foodstuff material from said orifice slot and each movement of said opening past said orifice slot permitting the extrusion of a sheet blank as it is being shaped by said sharp edge for forming circular foodstuff product blanks, said elliptical opening defined by said sharp edge having a significant ellipticity in the circumferential direction, with $M_1$ being more than 1.25 times as large as $M_2$, for causing said sharp edge to sweep past the orifice slot at a faster rate than the circular blank being extruded from said orifice slot for avoiding interference by the revolving escapement member with the advancing circular blank being formed.

11. Revolving cylinder escapement extrusion apparatus for shaping relatively wide and thin foodstuff product blanks, said apparatus being of the type having an extrusion orifice and feeding means for feeding foodstuff material under pressure to the orifice to thereby extrude the material through the orifice to be formed into foodstuff product blanks, said apparatus comprising:

a die assembly having a passage for feeding the foodstuff material downstream from said feeding means and including first and second die means at the downstream end of said conduit, said first and second die means forming an elongated narrow orifice slot for extruding the foodstuff material therethrough, a cylindrical escapement member having a cylindrical peripheral surface with a plurality of axially spaced, circumferentially overlapping blank-shaping openings therein, drive means for revolving said cylindrical escapement member about its axis, mounting means for revolvably mounting said escapement member outside of and downstream from said die assembly and adjacent to the orifice slot with the axis of said escapement member extending parallel with said elongated orifice slot and with the cylindrical peripheral surface of said escapement member revolving past said orifice slot and adjacent to both said first and second die means for controlling the extrusion of the foodstuff material through said orifice slot while shaping the extruded foodstuff material into foodstuff product blanks, and said plurality of axially spaced blank-shaping openings being located at different angular positions about the axis of said escapement member and overlapping each other in the circumferential direction for diminishing the flow of the extruded material being shaped by one of said openings while concurrently increasing the flow of the extruded material being shaped by another of said openings for producing an aggregate flow through said passage which continues without undue surging.

12. The revolving cylinder escapement extrusion apparatus, as claimed in claim 11, in which:

said first and second die means are a pair of opposing spaced, parallel die members which define the elongated orifice slot, said slot extending along the axial length of said revolving escapement member in which said plurality of openings are located, whereby all of the foodstuff material being shaped by said plurality of openings passes through the same elongated orifice slot, one of said die members being relatively selectively adjustable with respect to the other die member to uniformly adjust the width of the orifice slot along the full length of the slot for equally adjusting the thickness of all of the product blanks being shaped.

13. The revolving cylinder escapement extrusion apparatus, as claimed in claim 12, in which:

said spaced parallel die members both have curved surfaces concentric with and in contact with said revolving cylindrical escapement member, one of said curved die members being fixed and the other of said curved die members being mounted for adjustment movement in a path concentric with said revolving cylindrical member for remaining in contact with the cylindrical surface of said escapement member.

14. The revolving cylinder escapement extrusion apparatus, as claimed in claim 12, in which:
one of said die members is fixed relative to said passage and has a curved surface concentric with and in contact with the cylindrical surface of said revolving escapement member, and
said other die member is a flat plate mounted for adjustment movement along a rectilinear path tangential to said cylindrical surface toward and away from the fixed die member with manual adjustment means for moving the adjustable die member along said straight path.

15. The revolving cylindrical escapement extrusion apparatus, as claimed in claim 14, in which:
said flat plate die member has a lip which defines one side of the elongated orifice slot,
said lip being offset by an amount X below the region where said plate is tangential to the cylindrical surface of said revolving extrusion member, and
means for limiting the adjustment movement of said adjustable die plate member not to exceed the amount of offset X.

16. The revolving cylindrical escapement extrusion apparatus, as claimed in claim 11, in which:
said mounting means for revolvably mounting said cylindrical escapement member includes a stub shaft projecting from each end of said escapement member with a bearing positioned on each stub shaft,
a bracket on said die assembly near the opposite ends of said escapement member for holding the respective bearings, and
a manually releasable clamp on each bracket for removably clamping the bearings in place for quick easy removal of the revolvable escapement member from its normal position adjacent to the orifice slot for convenience in cleaning the escapement member and the first and second die means.

17. The revolving cylinder escapement extrusion apparatus, as claimed in claim 11, in which:
each said circumferentially overlapping blank-shaping openings extends around the major portion of the circumference of the revolving escapement member.

* * * * *